US007518838B1

(12) United States Patent
Oldenburg et al.

(10) Patent No.: US 7,518,838 B1
(45) Date of Patent: Apr. 14, 2009

(54) PROTECTION OF VARIABLE FREQUENCY POWER SYSTEMS FROM EXCESSIVE PEAK ELECTRICAL POTENTIALS

(75) Inventors: Wayne H. Oldenburg, Roscoe, IL (US); Nicholas Allen Lemberg, Milwaukee, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 26 days.

(21) Appl. No.: 11/940,342

(22) Filed: Nov. 15, 2007

(51) Int. Cl.
 *H02H 7/09* (2006.01)
(52) U.S. Cl. ............... 361/33; 361/1; 361/21; 361/23; 361/55; 361/56; 361/93.1; 361/95; 363/50
(58) Field of Classification Search .......... 361/33, 361/91.1, 55, 56, 1, 93.1, 95, 23; 363/50
See application file for complete search history.

(56) References Cited

U.S. PATENT DOCUMENTS

| | | | | |
|---|---|---|---|---|
| 3,571,698 | A * | 3/1971 | McCabe | 323/263 |
| 4,694,187 | A * | 9/1987 | Baker | 290/4 R |
| 4,918,592 | A * | 4/1990 | Shimizu | 363/50 |
| 5,528,445 | A * | 6/1996 | Cooke et al. | 361/20 |
| 6,307,358 | B1 * | 10/2001 | Conrad | 323/282 |
| 7,005,833 | B2 * | 2/2006 | Adams | 322/37 |
| 7,333,316 | B1 * | 2/2008 | Norris | 361/111 |
| 2007/0291426 | A1 * | 12/2007 | Kasunich et al. | 361/33 |
| 2008/0074812 | A1 * | 3/2008 | Oestreich et al. | 361/33 |

* cited by examiner

Primary Examiner—Rita Leykin
(74) Attorney, Agent, or Firm—Stephen G. Mican

(57) ABSTRACT

A method of protecting an electromechanical power transfer system from excessive peak electrical potentials, the power transfer system comprising a prime mover, a dynamoelectric machine coupled to the prime mover for generating multiphase alternating current (AC) power, and at least one multiphase AC electrical load coupled to the dynamoelectric machine by way of a multiphase AC power bus, the dynamoelectric machine having a control coil responsive to control current for varying power supplied to the electrical load, comprises the steps of: analysing electrical potentials on the power bus to generate analysed power bus characteristics; comparing the analysed power bus characteristics to predetermined power bus characteristics; simultaneously shunting power across the power bus and reducing control current to the control coil for the dynamoelectric machine when the analysed power bus characteristics approximate the predetermined power bus characteristics to reduce the measured electrical potentials; and simultaneously terminating the shunt of power across the power bus and restoring the level of control current to the control coil for the dynamoelectric machine after a selected delay period to automatically restore power to the electrical load.

27 Claims, 1 Drawing Sheet

PROTECTION OF VARIABLE FREQUENCY POWER SYSTEMS FROM EXCESSIVE PEAK ELECTRICAL POTENTIALS

FIELD OF THE INVENTION

The invention relates to variable frequency electromechanical power transfer systems, and more particularly a means for protecting such power transfer systems from excessive peak electrical potentials whilst in a generating mode.

BACKGROUND OF THE INVENTION

Electromechanical power transfer systems, such as gas turbine-engine driven aeronautical electrical generation systems, generate large electrical potentials upon removal of large loads or faults by an electrical system circuit breaker or other means. Traditionally, electromechanical power transfer systems for aeronautical applications have operated in a constant frequency alternating current (AC) mode, generally employing an electrical power frequency of 400 Hz, and the electromagnetic saturation of a gas turbine driven dynamoelectric machine used for generating electrical power at that frequency and speed limited the resulting peak potentials. Aeronautical electrical loads have designs that tolerate and survive the peak potentials from the load and fault removals. Newer aeronautical electromechanical power transfer systems are migrating to a variable frequency AC mode of operation. These types of systems employ an electrical power frequency that may vary between 350 Hz and 800 Hz. At the lowest frequencies of such electromechanical power transfer systems, the peak potentials are essentially the same as conventional 400 Hz systems, but at the higher frequencies, the peak potential is substantially higher. Peak potential has a near linear relationship to the electrical power frequency in such systems. Consequently, aeronautical electrical loads may be subject to potentials approximately twice as large in systems operating in the variable frequency AC mode compared to operating in the constant frequency mode. This increased peak potential can damage such electrical loads.

SUMMARY OF THE INVENTION

The invention generally comprises a method of protecting an electromechanical power transfer system from excessive peak electrical potentials, the power transfer system comprising a prime mover, a dynamoelectric machine coupled to the prime mover for generating multiphase alternating current (AC) power, and at least one multiphase AC electrical load coupled to the dynamoelectric machine by way of a multiphase AC power bus, the dynamoelectric machine having a control coil responsive to control current for varying power supplied to the electrical load, comprising the steps of: analysing electrical potentials on the power bus to generate analysed power bus characteristics; comparing the analysed power bus characteristics to predetermined power bus characteristics; simultaneously shunting power across the power bus and reducing control current to the control coil for the dynamoelectric machine when the analysed power bus characteristics approximate the predetermined power bus characteristics to reduce the measured electrical potentials; and simultaneously terminating the shunt of power across the power bus and restoring the level of control current to the control coil for the dynamoelectric machine after a selected delay period to automatically restore power to the electrical load.

DETAILED DESCRIPTION OF THE INVENTION

Figure 1:
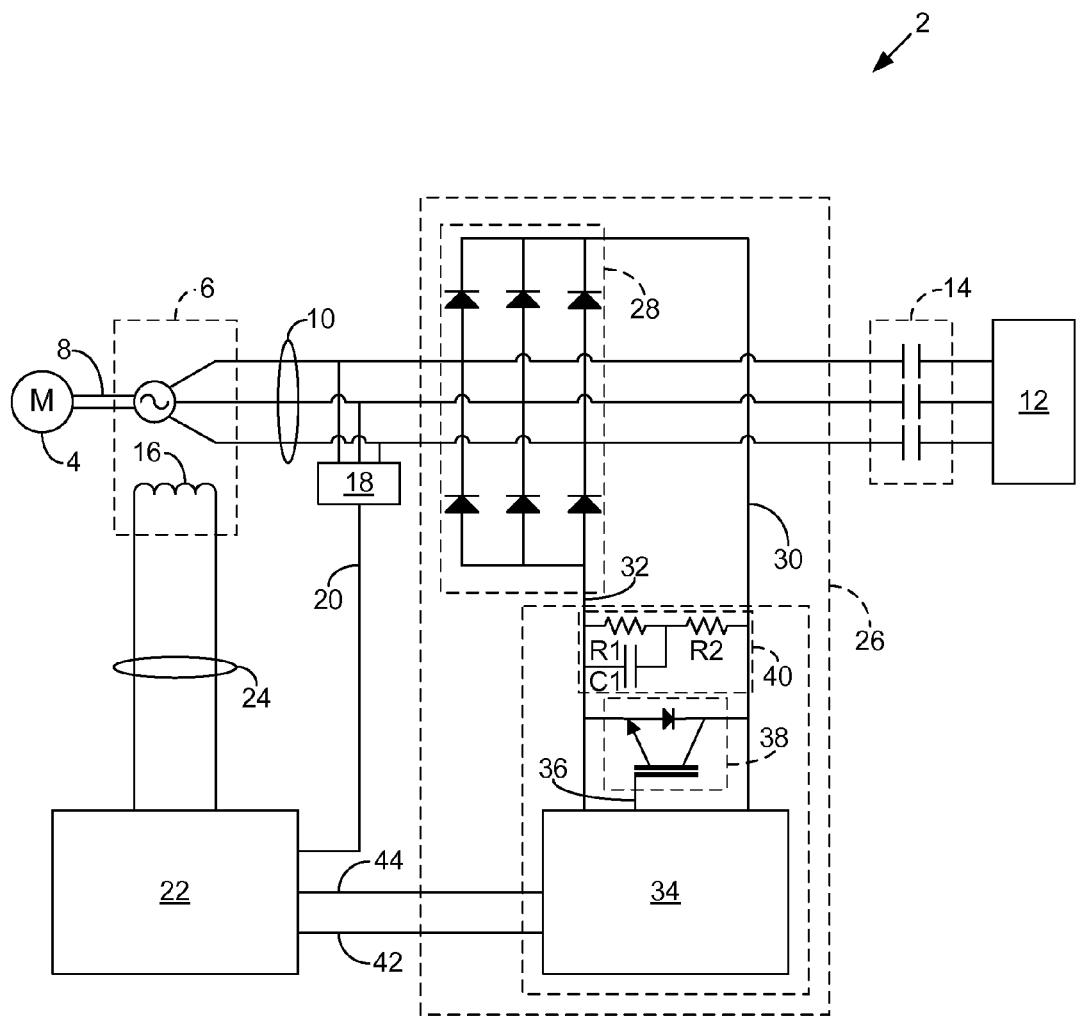
FIG. 1 is a high level schematic diagram of an electromechanical power transfer system configured for over potential protection according to a possible embodiment of the invention.

FIG. 1 is a high level schematic diagram of an electromechanical power transfer system 2 configured for over potential protection according to a possible embodiment of the invention. The power transfer system 2 comprises a prime mover 4, such as a gas turbine engine, that couples to a multiphase AC dynamoelectric machine 6 by way of a drive shaft 8. The dynamoelectric machine 6 may comprise any machine with a controllable electrical potential or current output, such as a wound field synchronous machine (WFSM) or a controllable permanent magnet machine (PMM). An example of a controllable PMM is found in co-pending application Ser. Nos. 10/996,411 and 11/420,614, by Dooley, both incorporated herein by reference. The dynamoelectric machine 6 has a multiphase AC output on an AC power bus 10 to power at least one multiphase AC electrical load 12. A multiphase AC isolation contactor or generator control breaker (GCB) 14 inserted in the power bus 10 between the dynamoelectric machine and the electrical load 12 may serve to protect the power transfer system 2 from downstream electrical faults. The output of the dynamoelectric machine 6 is controllable by way of an electric field generated by control current that passes through a control coil 16 within the dynamoelectric machine 6. In the case of a WFSM, such a control coil 6 is an exciter stator that receives exciter drive current. In the case of a controllable PMM, the control coil 6 receives control coil current.

A multiphase AC potential sensor system 18 measures the electrical potentials on the power bus 10 to generate corresponding power bus potential signals on a sensor system signal bus 20. A generator or system control unit 22 receives the power bus potential signals by way of the sensor system signal bus 20 and compares them to a predetermined reference potential. The system control unit 22 then supplies a level of the control current to the control coil 16 by way of a control coil current bus 24 that maintains the potentials on the power bus at or near the predetermined reference potential under ordinary operating conditions.

However, particularly when the power transfer system 2 produces power on the power bus 10 over a wide range of frequencies that may even exceed a two-to-one ratio, such as approximately 350 to 800 Hz, any transient peak potentials not controllable by the system control unit 22 may cause damage to the power transfer system 2 and the electrical load 12 without triggering the isolation contactor 14. An electronic multiphase AC shunt system 26 shunts current through the power bus 10 under such conditions to prevent such damaging transient peak potentials.

The shunt system 26 comprises a multiphase AC rectifier system 28 that converts multiphase AC power on the power bus 10 to direct current (DC) power, with a positive DC rail potential on a positive DC rail 30 and a negative DC rail potential on a negative DC rail 32. The shunt system 26 also comprises a shunt system controller 34 that analyses characteristics of the power bus 10 by means of sensing the DC potentials on the positive DC rail 30 and the negative DC rail 32, compares the analysed power bus characteristics to predetermined power bus characteristics and if the difference approximates the predetermined power bus characteristics it generates a gate drive signal on a gate drive line 36.

For instance, the analysed power bus characteristics may be electrical potentials on the power bus 10 derived by measuring the DC potentials on the positive DC rail 30 and the negative DC rail 32 and the predetermined power bus characteristics may be predetermined maximum peak potentials on the power bus 10. Alternatively, the analysed power bus characteristics may comprise present electrical potentials and rate of change in potentials on the power bus 10 derived by measuring the DC potentials and rate of change in the DC potentials on the positive DC rail 30 and the negative DC rail 32, or predicted maximum peak potentials on the power bus 10 based on the present electrical potentials and rate of change in the potentials on the power bus 10. Likewise, the predetermined power bus characteristics may comprise predetermined maximum present electrical potentials and rate of change in potentials on the power bus 10 or maximum allowable predicted peak potentials on the power bus 10.

The shunt system 26 additionally comprises a high speed electronic switch 38, such as an insulated gate bipolar transistor (IGBT) as shown in FIG. 1, or a metal oxide silicon field effect transistor (MOSFET) in lower power applications, receives the gate drive signal on the gate drive line 36 and responds by shorting the positive gate rail 30 to the negative gate rail 32, thereby shunting the AC power on the power bus 10 by way of the multiphase AC rectifier system 28. A low pass filter system 40 that connects across the electronic switch 38, such as a low pass filter comprising resistors R1 and R2 with capacitor C1 shunting resistor R1 in FIG. 1, may be useful to reduce high frequency transients or noise caused by the switching action of the electronic switch 38.

The shunt system controller 34 generates a shunt activation signal on a shunt activation signal line 42 whenever the shunt system controller 34 generates a gate drive signal to activate the electronic switch 38. The system control unit 22 receives the shunt activation signal on the shunt activation signal line 42 and responds by cutting or reducing control current on the control current bus 24 that supplies the control coil 16 in the dynamoelectric machine 6. This minimises the power that the shunt system 26 must shunt across the power bus 10 during sensed peak potentials that exceed the predetermined peak potential level. After a selected delay period, the system control unit 22 generates a shunt termination signal on a shunt termination line 44. The shunt system controller 34 receives the shunt termination signal on the shunt termination line 44 and responds by terminating the gate drive signal on the gate drive line 36, thereby deactivating the electronic switch 38 and terminating the shunt of the power bus 10 by the shunt system 26. The selected delay period may comprise a fixed period or a variable period, such as a variable period that varies in proportion to at least one of the analysed power bus characteristics, such as the rate of change in potentials on the power bus 10.

A multiphase AC silicon controlled rectifier (SCR) or triode for AC (TRIAC) bridge may alternatively replace the rectifier system 28 and the electronic switch 38. In this case, the gate drive signal on the gate drive line 36 may drive such a SCR or TRIAC bridge to combine the functions of the rectifier system 28 and the electronic switch 38 if the positive DC rail 30 and the negative DC rail 32 short together to shunt the power bus phases and the shunt controller is responsive to the power bus potential signals on the sensor system signal bus 20.

The entire shunting operation as hereinbefore described may easily complete within a 50 millisecond period, which is usually a dead bus requirement of the electrical load 12 to be able to sustain and continue proper operation. Longer shunting times are also acceptable but may require the electrical load 12 to recover from an abnormal dead bus time. As hereinbefore described, the shunt system 26 is separate from the system control unit 22. Alternatively, the system control unit 22 may comprise at least some of the hereinbefore-described components of the shunt system 26 so that the system control unit 22 itself controls or shunts the power bus 10. If the system control unit 22 incorporates the functions of the shunt system controller 34, the system control unit 22 may utilise the multiphase AC potential sensor system 18 to analyse the characteristics of the power bus 10 by means of sensing the electrical potentials on the power bus 10 directly. The hereinbefore-described embodiment of the invention is only an illustrative implementation of the invention wherein changes and substitutions of the various parts and arrangement thereof are within the scope of the invention as set forth in the attached claims.

The claimed invention is:

1. A method of protecting an electromechanical power transfer system from excessive peak electrical potentials, the power transfer system comprising a prime mover, a dynamoelectric machine coupled to the prime mover for generating multiphase alternating current (AC) power, and at least one multiphase AC electrical load coupled to the dynamoelectric machine by way of a multiphase AC power bus, the dynamoelectric machine having a control coil responsive to control current for varying power supplied to the electrical load, comprising the steps of:

analysing electrical potentials on the power bus to generate analysed power bus characteristics;

comparing the analysed power bus characteristics to predetermined power bus characteristics;

simultaneously shunting power across the power bus and reducing control current to the control coil for the dynamoelectric machine when the analysed power bus characteristics approximate the predetermined power bus characteristics to reduce the measured electrical potentials; and simultaneously terminating the shunt of power across the power bus and restoring the level of control current to the control coil for the dynamoelectric machine after a selected delay period to automatically restore power to the electrical load.

2. The method of claim 1, wherein the dynamoelectric machine comprises a wound field synchronous machine (WFSM) and its control coil comprises its exciter stator.

3. The method of claim 1, wherein the dynamoelectric machine comprises a controllable permanent magnet machine (PMM).

4. The method of claim 1, wherein the step of analysing electrical potentials on the power bus further comprises the steps of:

rectifying the electrical potentials on the power bus to generate rectified power bus potentials; and analysing the rectified power bus potentials.

5. The method of claim 4, wherein the step of comparing the analysed power bus characteristics to predetermined power bus characteristics comprises comparing the analysed rectified power bus potentials to a predetermined maximum rectified potential.

6. The method of claim 4, wherein the step of simultaneously shunting power across the power bus and reducing control current to the control coil for the dynamoelectric machine comprises shunting the rectified power bus potentials.

7. The method of claim 6, wherein the step of simultaneously terminating the shunt of power across the power bus and restoring the level of control current to the control coil for the dynamoelectric machine comprises removing the shunt of the rectified power bus potentials.

8. The method of claim 1, wherein the step of shunting shunts when the analysed power bus characteristics approaching the predetermined power bus characteristics.

9. The method of claim 1, wherein the step of shunting shunts when the measured power bus characteristics exceeding the predetermined power bus characteristics.

10. The method of claim 1, wherein the step of analysing electrical potentials on the power bus further comprises measuring the rate of change in the electrical potentials.

11. The method of claim 10, wherein the analysed power bus characteristics comprise present electrical potentials and rate of change in potentials on the power bus and the predetermined power bus characteristics may comprise predetermined maximum present electrical potentials and rate of change in potentials on the power bus.

12. The method of claim 10, wherein the analysed power bus characteristics comprise predicted maximum peak potentials on the power bus on the present electrical potentials and rate of change in the potentials on the power bus and the predetermined power bus characteristics comprise maximum allowable predicted peak potentials on the power bus.

13. The method of claim 1, wherein the step of simultaneously terminating the shunt of power across the power bus and restoring the level of control current to the control coil for the dynamoelectric machine after a selected delay period comprises a delay period that varies in proportion to at least one of the analysed power bus characteristics.

14. The method of claim 13, wherein the selected delay period varies in proportion to the rate of change in potentials on the power bus 10.

15. An electromechanical power transfer system comprising:
 a prime mover;
 at least one multiphase AC electrical load;
 a dynamoelectric machine coupled to the prime mover by way of a drive shaft and coupled to the electrical load by way of a multiphase AC power bus for generating multiphase alternating current (AC) power for the electrical load, the dynamoelectric machine having a control coil responsive to control current for varying power supplied to the electrical load;
 a system control unit for varying the control coil current to maintain constant electrical potential levels on the power bus; and
 an electronic multiphase AC shunt system; wherein
 the shunt system analyses electrical potentials on the power bus to generate analysed power bus characteristics, compares the analysed power bus characteristics to predetermined power bus characteristics, shunts power across the power bus and simultaneously generates a shunt activation signal when the analysed power bus characteristics approximates the predetermined power bus characteristics to reduce the measured electrical potentials;
 the system control unit receives the shunt activation signal and responds by reducing control current to the control coil for the dynamoelectric machine, then restores the level of control current to the control coil for the dynamoelectric machine after a predetermined period and generates a shunt termination signal; and
 the shunt system receives the shunt termination signal and responds by terminating the shunt of power across the power bus to automatically restore power to the electrical load.

16. The electromechanical power transfer system of claim 15, wherein the dynamoelectric machine comprises a wound field synchronous machine (WFSM) and its control coil comprises its exciter stator.

17. The electromechanical power transfer system of claim 15, wherein the dynamoelectric machine comprises a controllable permanent magnet machine (PMM).

18. The electromechanical power transfer system of claim 15, wherein the system control unit comprises at least part of the shunt system.

19. The electromechanical power transfer system of claim 15, wherein the shunt system comprises:
 a multiphase AC rectifier system for rectifying AC power on the power bus to generate direct current (DC) power with a positive potential level and a DC potential negative level; and
 a shunt system controller for measuring the generated positive and negative DC potential levels to analyse the power bus characteristics and comparing the analysed power bus characteristics with the predetermined power bus characteristics.

20. The electromechanical power transfer system of claim 19, wherein the shunt system further comprises an electronic switch and the shunt system controller generates a gate drive signal when the measured electrical potentials exceed the predetermined maximum electrical potential, the electronic switch receives the gate drive signal and responds by shunting the DC power across the rectifier system.

21. The electromechanical power transfer system of claim 20, wherein the shunt system controller terminates the gate drive signal to terminate the shunt of DC power across the rectifier system in response to receiving the shunt termination signal.

22. The electromechanical power transfer system of claim 20, wherein the electronic switch comprises an insulated gate bipolar transistor (IGBT).

23. The electromechanical power transfer system of claim 20, the electronic switch comprises a metal oxide silicon field effect transistor (MOSFET).

24. The electromechanical power transfer system of claim 15, wherein the shunt system comprises:
 a multiphase AC potential sensor system for measuring potentials on the power bus and generating corresponding power bus potential signals;
 a shunt system controller for measuring the generated power bus potential signals to analyse the power bus characteristics and comparing the analysed power bus characteristics with the predetermined power bus characteristics; and
 a multiphase AC shunt switch system for shunting AC power on the power bus.

25. The electromechanical power transfer system of claim 24, wherein the multiphase AC shunt switch system comprises a silicon controlled rectifier (SCR) bridge to shunt the power bus phases.

26. The electromechanical power transfer system of claim 24, wherein the multiphase AC shunt switch system comprises a triode for AC (TRIAC) bridge to shunt the power bus phases.

27. For an electromechanical power transfer system that comprises a prime mover, a dynamoelectric machine coupled to the prime mover for generating multiphase alternating current (AC) power, and at least one multiphase AC electrical load coupled to the dynamoelectric machine by way of a multiphase AC power bus, the dynamoelectric machine having a control coil responsive to control current for varying power supplied to the electrical load, a system for protecting the power transfer system from excessive peak electrical potentials comprising;

a system control unit for varying the control coil current to maintain constant electrical potential levels on the power bus; and an electronic multiphase AC shunt system; wherein the shunt system analyses electrical potentials on the power bus to generate analysed power bus characteristics, compares the analysed power bus characteristics to predetermined power bus characteristics, shunts power across the power bus and simultaneously generates a shunt activation signal when the analysed power bus characteristics approximates the predetermined power bus characteristics to reduce the measured electrical potentials;

the system control unit receives the shunt activation signal and responds by reducing control current to the control coil for the dynamoelectric machine, then restores the level of control current to the control coil for the dynamoelectric machine after a predetermined period and generates a shunt termination signal; and the shunt system receives the shunt termination signal and responds by terminating the shunt of power across the power bus to automatically restore power to the electrical load.

* * * * *